Oct. 6, 1964   H. W. GROTEWOLD   3,151,643
APPARATUS FOR SECTIONIZING CITRUS FRUIT
Filed April 27, 1962   6 Sheets-Sheet 2
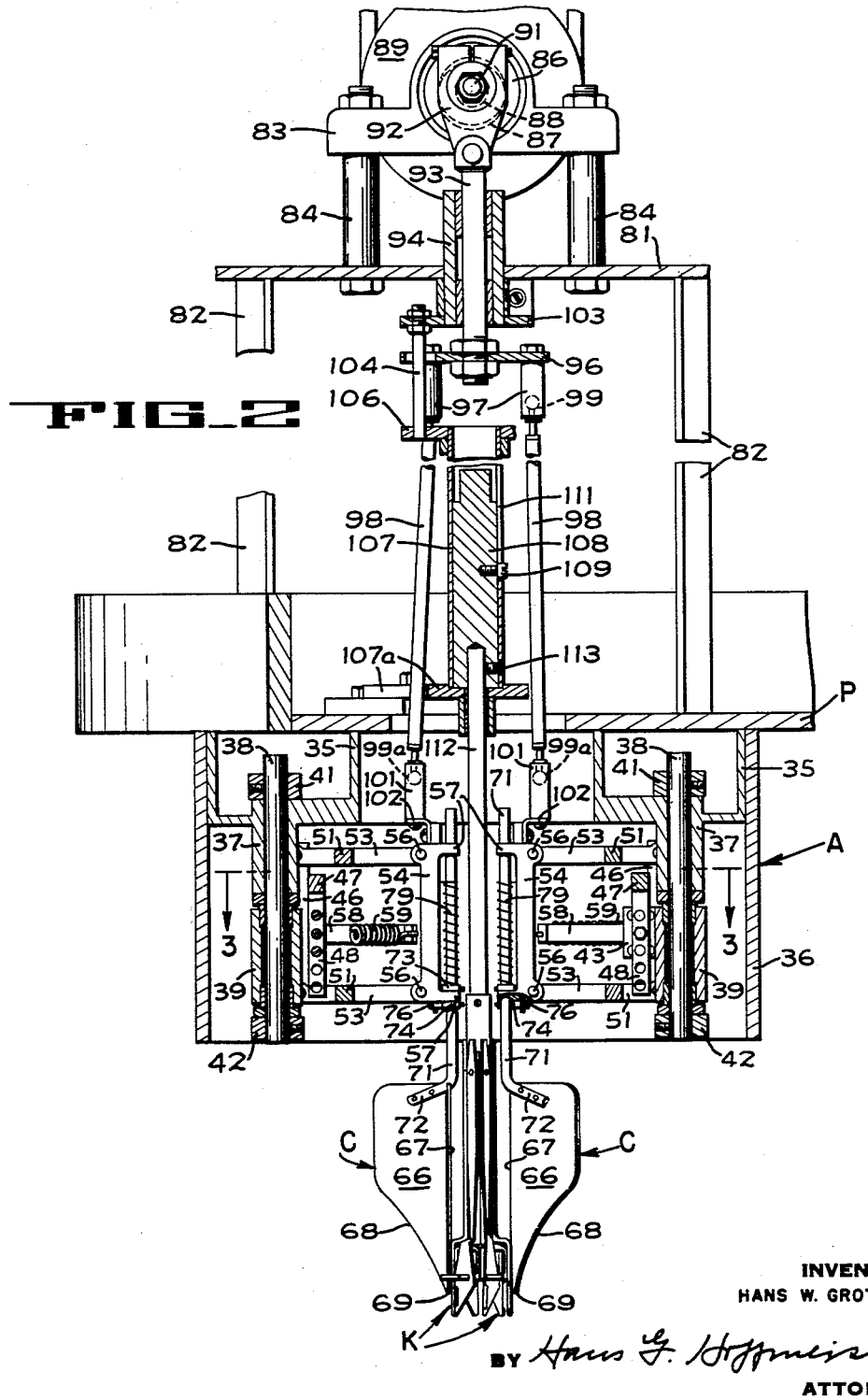
INVENTOR
HANS W. GROTEWOLD
BY *Hans G. Hofmeister*
ATTORNEY

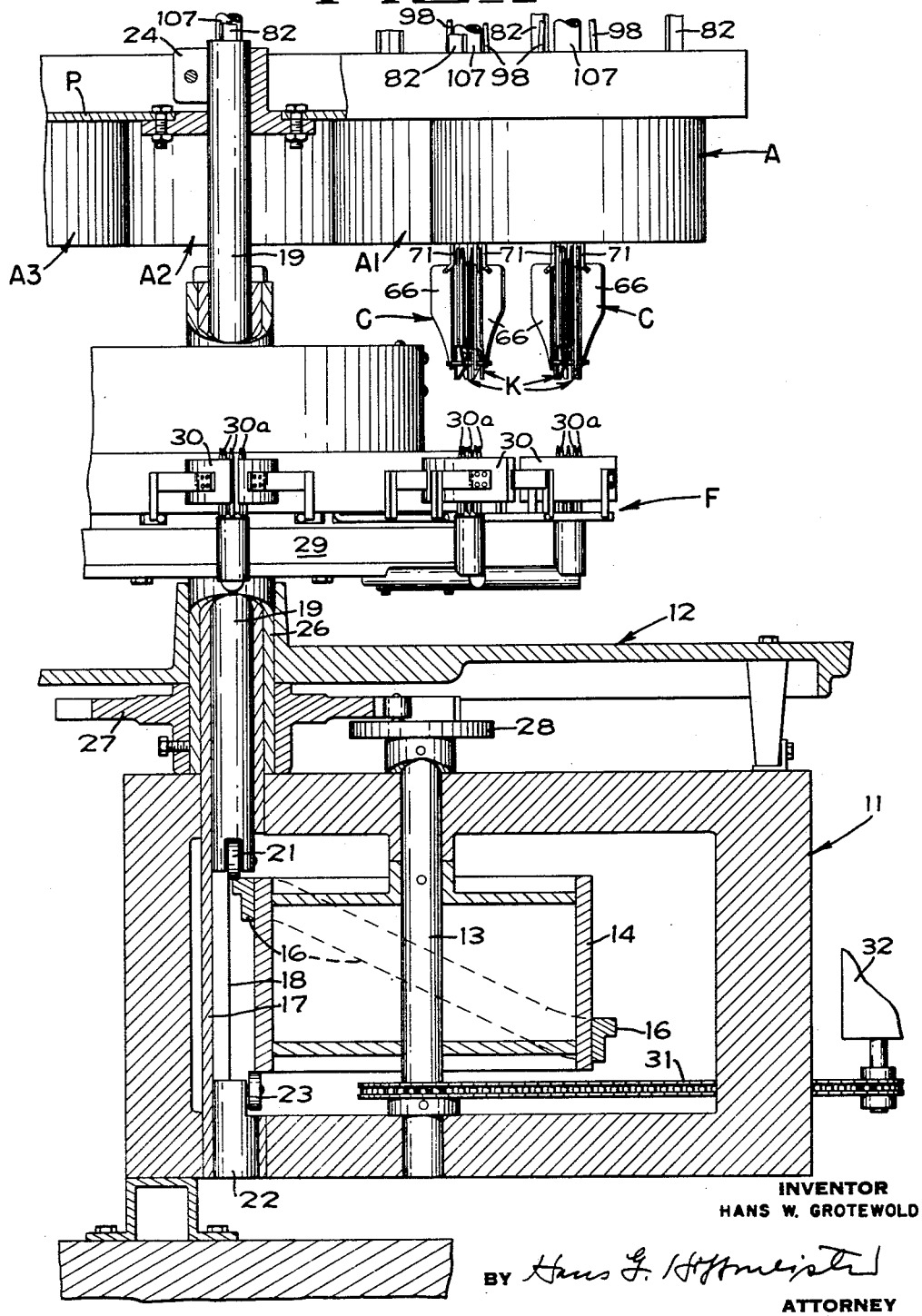

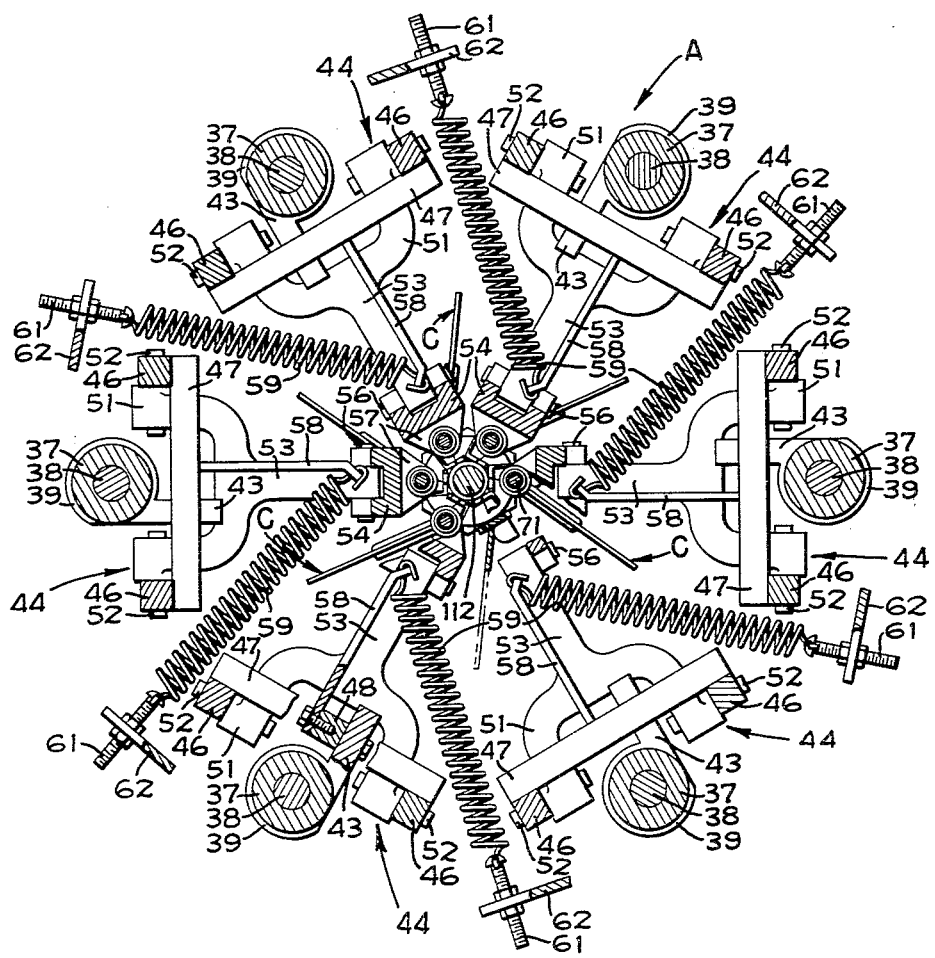

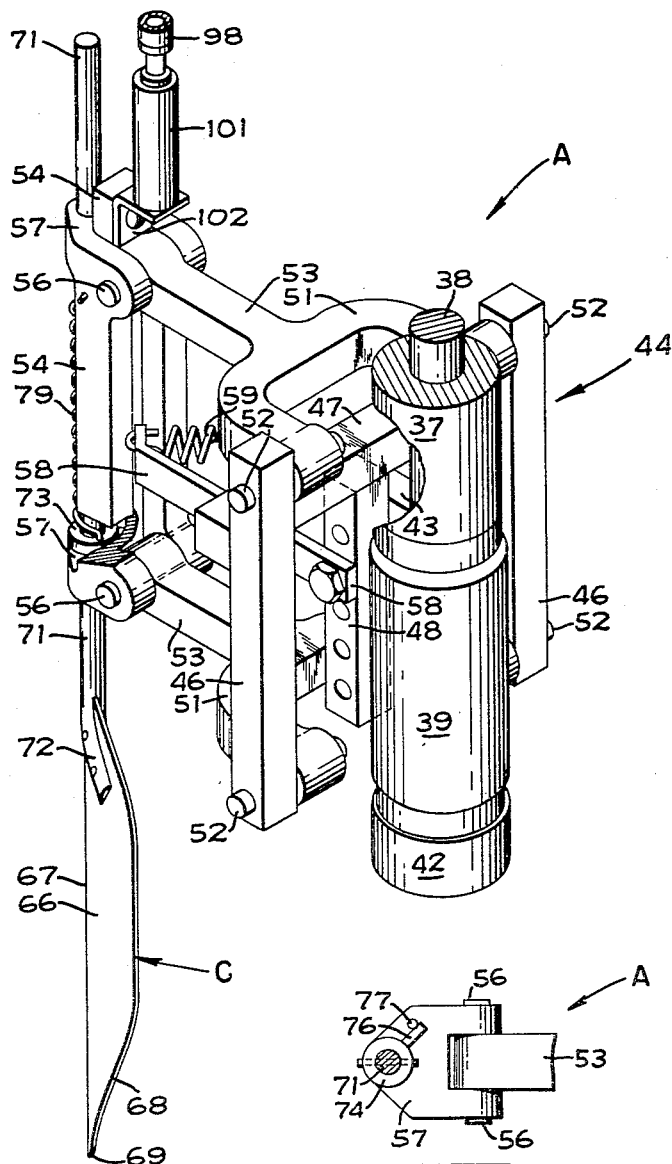

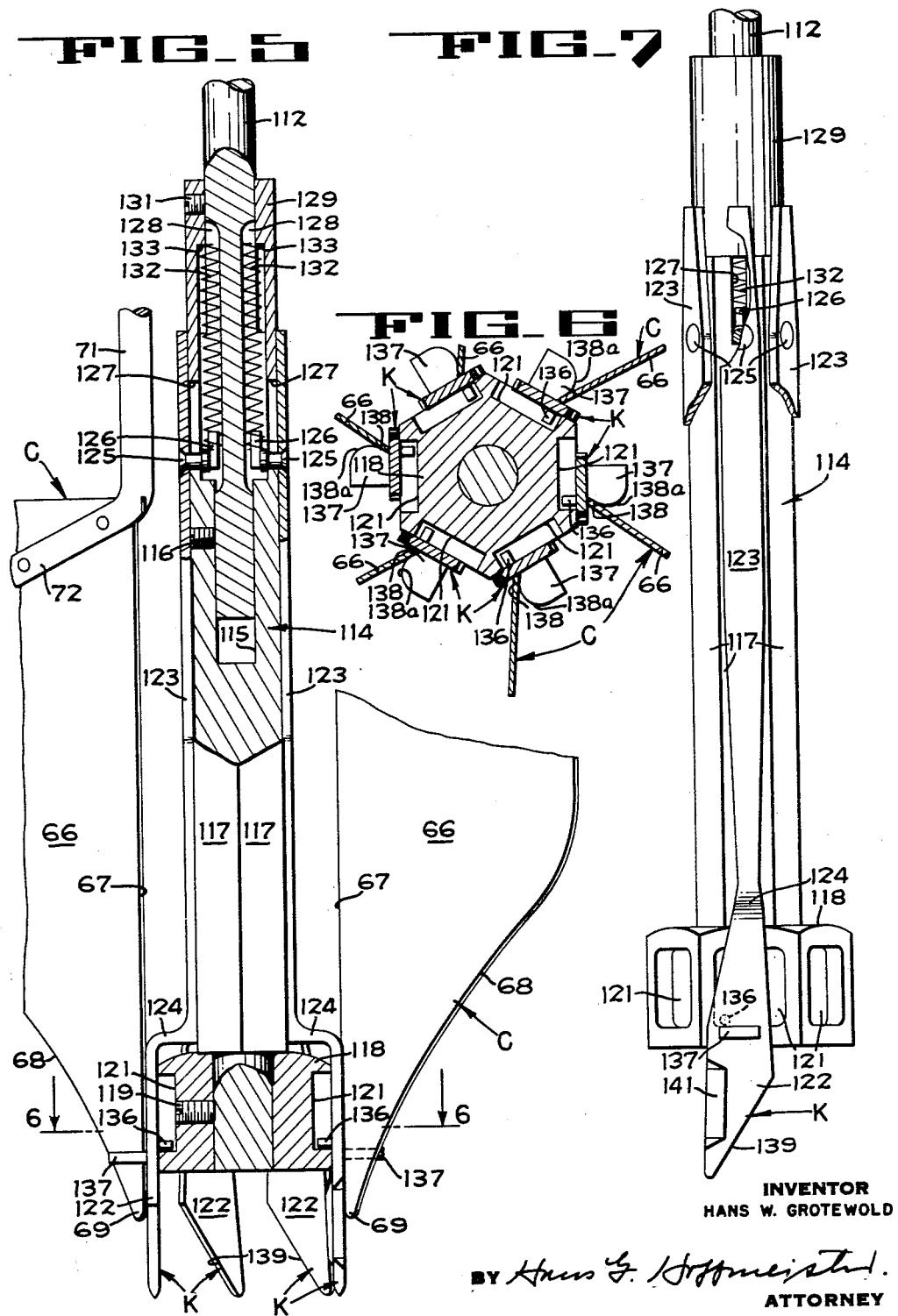

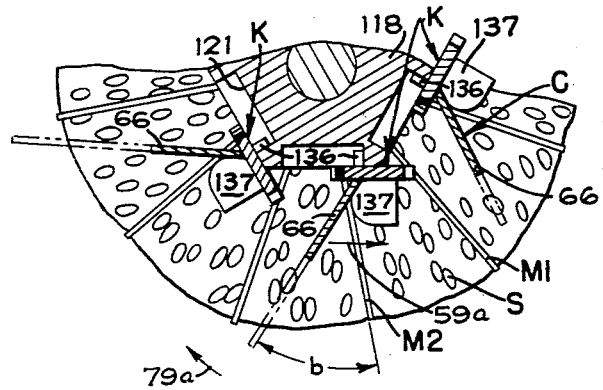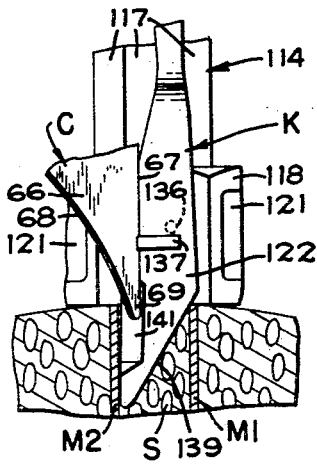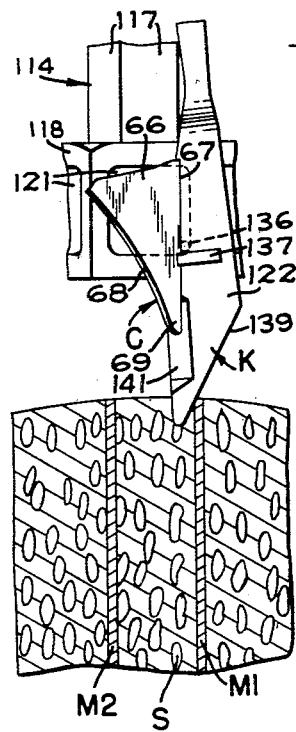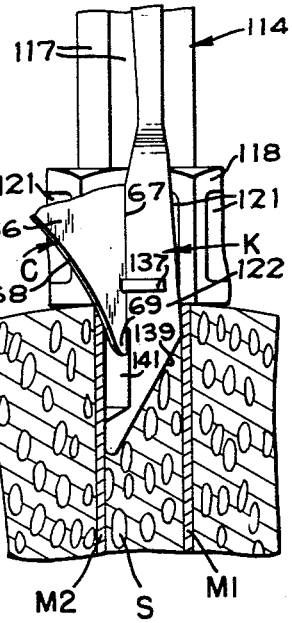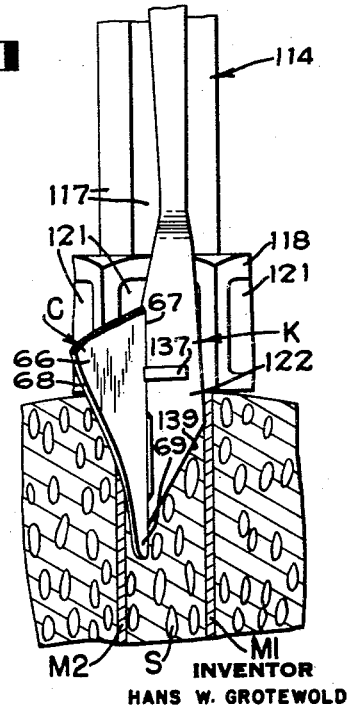

United States Patent Office 3,151,643
Patented Oct. 6, 1964

3,151,643
APPARATUS FOR SECTIONIZING CITRUS FRUIT
Hans W. Grotewold, Sebring, Fla., assignor to FMC Corporation, San Jose, Calif., a corporation of Delaware
Filed Apr. 27, 1962, Ser. No. 190,566
13 Claims. (Cl. 146—3)

The invention pertains to the processing of citrus fruit, and more particularly relates to apparatus for sectionizing citrus fruit, such as grapefruit.

The meat of juice-bearing portion of citrus fruit is composed of groups of interconnected juice sacs, each group being in the form of a segmental section which is surrounded by a membrane. The portions of the segment wall, which extend more or less radially from the core of the whole friut and define the plane faces of the segment, are referred to as radial membranes, while the portion of the segment wall which lies adjacent the peel of the fruit and defines the spherical face of the segment is called the outer membrane.

In the citrus fruit industry, "sectionizing" is an operation by which the naturally-shaped, membrane-free meat segments are removed from the citrus fruit, particularly grapefruit, and this operation is generally performed by first peeling off the outer skin and albedo, subjecting the fruit to a hot lye treatment to remove the outer membrane from the segments, and stirpping individually the segmental juice sac groups from their radial membranes. The stripping operation is usually carried out manually by inserting a blade between the meat segments and each radial membrane and then cutting the meat segments loose from the membrane. Such manual sectionizing is inefficient since the speed at which the operators must work makes it impossible for them to handle small, irregular meat segments or to carefully cut loose even the larger meat segments.

The apparatus of this invention is of the type wherein a plurality of blades are mounted on a blade carrier assembly. The fruit is mounted below the blades with the fruit axis aligned with the axis of the blades. The blade carrier assembly is lowered to cause the blades to pass between a juice sac and the associated membrane, to separate these parts. A plurality of such assemblies may be provided, each of which perform part of the complete segmenting operation. Such an apparatus is disclosed in the application of Belk, S.N. 823,107, filed June 26, 1959, now Patent No. 3,105,531, which is assigned to the assignee of the present application.

An object of the present invention is to automatically position the membrane separating blades so that they are disposed at the juncture between the membrane and the associated juice cell sac before cutting begins.

Another object of the invention is to position the separating blades in the manner mentioned above by means which will not be interfered with by the presence of seeds adjacent the core of the fruit.

Another object of the invention is to provide finding means for positioning the cutting blades that automatically compensate for variations in the lateral spacings of the membranes.

Another object of the invention is to provide a blade mounting and blade construction that will cause the separating blade to ride along the surface of a membrane and progressively enter and separate the juice cell sac from the membrane while the blade is automatically turning to penetrate the fruit.

The manner in which these and other objects of the invention may be attained will be apparent from the following detailed description of the invention and the accompanying drawings.

FIG. 1 is a partial vertical section of the apparatus of the present invention showing the drive means for reciprocating the blade carrying assemblies.

FIG. 2 is an enlarged section through one of the blade carrying assemblies.

FIG. 3 is a section through a blade carrying assembly taken on 3—3 of FIG. 2.

FIG. 4 is an enlarged perspective showing the mounting of one of the cutting blades.

FIG. 4a is an enlarged fragmentary bottom elevation showing a stop collar for one of the cutting blades.

FIG. 5 is an enlarged partial section through the cutting blade mounting shank.

FIG. 6 is a section taken on 6—6 of FIG. 5.

FIG. 7 is an enlarged side elevation of the finder blade mounting shank showing one of the finder blades.

FIG. 8 is an enlarged transverse section through the finder and cutter blades shown in relation to a grapefruit.

FIGS. 9–11 are enlarged vertical sections through a grapefruit showing progressive steps in the operation of the device.

FIG. 12 is a section similar to that of FIG. 11 showing the operation of the device with a fruit wherein the membranes are relatively close together.

FIGS. 1 to 3 show the general arrangement of the basic parts of the apparatus. Referring to FIG. 1, the drive assembly is mounted in a framework or housing 11. Partially supported by the housing is a fixed table or platform 12. The drive assembly includes a vertical shaft 13 upon which is mounted a barrel cam body 14 carrying a cam member 16. Extending vertically through the apparatus is a guide tube 17 which is cut away at 18 to receive the barrel cam. Vertically slidable in the tube 17 is a blade assembly reciprocating rod 19. Mounted on the lower end of the rod is a cam roller 21 for engaging the cam 16. In order to support the load of the blade carrier assemblies, a plug 22 is mounted in the lower portion of the guide tube 17, which plug carries a roller 23 that supports the under surface of the barrel cam body 14.

Blade carrier assemblies A, A1, A2 and A3 are supported on a plate P clamped to the upper end of the rod 19 by means of a clamp 24. A fruit supporting and indexing assembly F is provided which includes a turret 29, fruit supporting cups 30 and fruit impaling tines 30a. The angular spacing between adjacent fruit cups corresponds to that of the blade carrier assemblies, and since in the embodiment of FIG. 1 there are eight cups, this angular spacing is 45°. The assembly F is mounted on a rotatable sleeve 26 surrounding the tube 17. Fastened to the sleeve is a Geneva gear 27 which is intermittently indexed by a Geneva pinion member 28 mounted on the upper end of the shaft 13 that mounts the barrel cam. Details of the Geneva gear assembly do not form part of the invention and a suitable apparatus is shown in detail in my pending application, S.N. 730,335, filed April 23, 1958, now Patent No. 3,072,160. The shaft 13 for the barrel cam and the Geneva gear assembly is driven by a chain and sprocket assembly 31 connected to a reduction gear box 32 driven by a suitable motor, not shown.

The blade carrier assembly A is illustrated in FIGS. 2–4 and 4a. The assembly is mounted on plate P by means of a supporting ring 35 which is secured to the undersurface of plate P. A shield 36 may be provided to protect the parts. Extending downwardly from the ring are tubular guides 37 which mount stub shafts 38. When grapefruit are to be sectionized, there will ordinarily be six stub shafts 38 for each assembly. Pivotally mounted on each stub shaft 38 is a hub 39, and the several hubs and stub shafts are retained on the ring 35 by upper collars 41 and lower collars 42. Extending from each hub 39 is an arm 43 for mounting a cutting blade C and associated linkage. The blade mounting linkage is arranged so that the blade can be independently vibrated, as disclosed in the aforesaid application of Belk, S. N. 823,107. The blade mounting assembly, indicated generally at 44, in FIG. 4, includes a pair of vertically extending side bars 46 welded to a cross bar 47. Welded to and extending downwardly from the mid-portion of the cross bar 47 is a mounting lug 48 which is bolted to the arm 43 extending from the hub 39. Upper and lower yokes 51 are provided, the yokes being pivoted to the side bars 46 by means of pins 52. Each yoke has an extension 53 which is pivoted to a vertically extending link member 54 by means of pins 56. The links 54 have upper and lower ears 57 for mounting the cutting blades. A spring support arm 58 is bolted to each lug 48 and a coil spring 59 is conected to arm 58 at one end and to an adjustable spring eye 61 (FIG. 3) at the other end, the spring eye being carried by bracket 62 attached by means not shown to the mounting ring 35. Each cutting blade C has a flat blade or cutting portion 66 (FIG. 4) having a vertical edge 67 along the blade axis, and a tapered cutting or membrane separating edge 68. The blade is thin and the cutting edge is not sharpened, so that the blade separates the membranes from the juice sacs without actually cutting the juice sacs or the membranes. The tapered cutting edge 68 merges with the vertical edge 67 to form a sharp penetrating nose 69, so that the cutting action is progressive as the blade initially penetrates and then enters the fruit. The shank of the blade is in the form of a rod 71 having a bent split end 72 secured to the blade 66. The blade is retained in the ears 57 on the link 54 by an upper collar 73 and a lower collar 74 (FIG. 2). As seen in FIG. 4a, the lower collar 74 has a projection 76 that engages a stop pin 77 to prevent rotation of the blade in one direction. Coil springs 79 surround the rods 71, and each spring is anchored to the link 54 at its upper end and to the collar 73 at its lower end. The springs 79 are arranged to urge the cutting blades to rotate about their axes in a clockwise direction, as indicated by the arrow 79a in FIG. 8. The springs 59 tend to rotate the cutting blades and associated linkage in a counter-clockwise direction, as indicated by the arrow 59a in FIG. 8.

As mentioned, the cutting blades are vertically vibrated as they penetrate the fruit. In order to vibrate the blades an upper plate 81 (FIG. 2) is mounted on the plate P by means of uprights 82. A bearing block 83 is mounted on plate 81 by vertical standards 84. Mounted in the bearing block 83 is a bearing 86 in which rotates an eccentric 87 driven by a shaft 88 shown in dotted lines in FIG. 2. A pulley 89 is keyed to shaft 88 which pulley is driven by means arranged to permit the assembly A to move vertically up and down, as fully disclosed in the aforesaid application of Belk, S. N. 823,107.

Details of the drive means for vibrating the blades are not part of the invention and are not illustrated. Extending from the eccentric 87 and displaced from the axis of shaft 88 is a stud 91 which rotatably supports a downwardly extending link 92. Link 92 is pivoted to a vertical rod 93 that slides in a guide tube 94 attached to plate 81. The lower end of the sliding rod 93 mounts a small plate 96 which supports an upper set of tubular members 97 forming one part of a swivel joint. Rods 98 are mounted at their upper ends in members 97 by means of ball swivel connections 99. Similar swivel connections 99a mount the lower ends of the rods 98 in tubes 101 attached by means of brackets 102 to the links 54 that mount the cutting blades.

The mounting for the finder knives K is illustrated in FIG. 2. Starting near the top of the figure, a plate 103 is attached to the guide tube 94, and depending from the plate are a plurality of support bolts 104, only one of which is shown in FIG. 2. The bolts 104 are fixed to a plate 106 attached to the upper end of a vertical guide tube 107. Three such bolts are provided, two of which are not shown in FIG. 2. The lower end of the guide tube 107 is fastened to the plate P by a plate 107a. Slidable in the guide tube 107 is a cylindrical weight 108. This weight is prevented from rotation in the guide tube by a set screw 109 that rides in a slot 111 formed in the guide tube. Attached to the weight is a downwardly extending rod 112 fixed to the weight by means of a set screw 113.

Referring to FIG. 5, the finder blade support rod 112 is mounted in a finder blade shank 114, the rod fitting in a bore 115 in the shank and being retained by a set screw 116. The shank 114 has six faces 117, and a hexagonal head 118 is fixed to the end of the shank by means of a set screw 119. Square recesses 121 are formed at each of the six faces of head 118. Each finder knife K includes a lower blade portion 122, an upper elongated stem 123 and a bent portion 124 joining the blade and stem portions. The upper end of the stem 123 is mounted on the shank 114 by a pivot pin 125. The inner end of the pivot pin has an upwardly projecting stud 126 to form a spring seat. The pivot pins 125 ride in slots 127 formed in the shank 114. The rod 112 has a plurality of grooves 128 which are aligned with the slots 127. A sleeve 129 is mounted on the rod 112 by set screw 131, which sleeve retains a set of coil springs 132, one end of each spring resting on studs 126 with the other end bearing against a shoulder 133 formed on sleeve 129. Coil springs 132 urge each of the finder knives K to their lowermost position. Extending inwardly from the blade portion 122 of each finder knife K is a stop pin 136 that extends into the associated recess 121 formed in the hexagonal head 118. On the outer face of the blade portion of each finder knife K is a stop lug 137 which, as seen in FIG. 6, has a canted face 138, against which the cutting blades C bear in response to the force of the coil springs 59 (FIG. 3) that tend to pivot the entire cutting blade assembly about the stub shaft 38. The stop lugs have a rounded nose 138a (FIG. 6) about which the cutting blades roll during operation.

As seen in FIG. 7, each finder blade portion 122 has a tapered edge 139 which acts as a camming edge against a fruit membrane. The other edge of the finder knife is sharpened as at 141 to form a cutting edge to facilitate lateral finding motion of the knife.

The operation of the device will be explained with reference to FIGS. 8–11. In operation, a peeled fruit is mounted in the usual manner in a fruit support cup 30 (FIG. 1) which is positioned under the axis of the knife carrier assembly A. The barrel cam lowers the knife assembly and the point of the finder knife K enters a meat segment. This condition is illustrated in FIG. 9. It will be understood that the coil springs 59 are urging the cutting blades C against the stop lugs 137 on the finder knives, which in turn urges the pins 136 on the finder knives against the right hand wall of the recesses 121 in the head 118. This is indicated by the arrow 59a in FIG. 8. Also the coil springs 79 that surround the rods 71 supporting the cutting blades C will urge the cutting blades clockwise until the lug 76 on collar 74 engages the pin 77 on the link 54 (FIG. 4a). This is indicated by the arrow 79a in FIG. 8. Referring to FIG. 9, unless the finder knife K is centered with respect to the meat segment S disposed between membranes M1 and M2, the tapered edge surface 139 of the knife will engage the membrane M1 during the initial portion of the cycle. It should be noted that the weights 108 are heavy enough and the springs 132 are strong enough to cause the finder knives to penetrate the juice segments, but springs 132 are not strong enough to cause the finder knife edges 139 to cut the membranes.

As the blade carrier assembly continues its descent, the wedging action of the tapered surface 139 of the knife K against the membrane M1 urges the finder knife and associated cutting blade to the left in the figure. This wedging action continues until the finder knife engages the opposite membrane M2, as shown in FIG. 10. The cutting edge 141 on the finder knife facilitates this leftward motion through the meat segment S. The spacing of the membranes M1 and M2 illustrated in FIGS. 9–11 is the maximum expected spacing. At the stage of the cycle shown in FIG. 10, the head 118 rests on the fruit and further descent of the shank that supports the finder knife K is prevented. However, as the knife carrier assembly continues its descent, the cutting blade C continues to move down into the segment S, and the tapered edge 68 of the cutting knife rides along the edge of membrane M2. This causes counterclockwise rotation of the cutting blade against the force of the coil spring 79. The vertical edge portion of the cutting blade rolls around the curved edge 138a on the stop lug 137 as the cutting knife pivots. Thus, as the cutting blade enters the fruit, the edge 68 progressively separates the meat segments from the tapered membrane M2 and the cutting blade, which was initially at an acute angle b with a radial plane passing through the blade's axis (FIG. 8) gradually assumes a generally radial direction, parallel to the membrane M2. During this cutting or separating action, the cutting blades are vertically vibrated by the vibrating assembly. After the downward stroke is completed the cutting blade C will be disposed along the side of the membrane M2 and the associated side of the meat sac will have been separated from the membrane, without cutting or tearing the membrane or the meat sac. While the aforedescribed action is taking place in one of the segments S of the fruit, the other 5 cutting and finding blade assemblies are operating in a similar manner. At the completion of the down stroke of the knife carrier, assembly A is retracted and the fruit is ready for the succeeding assembly A1 (FIG. 1). As previously mentioned and as explained in detail in the Belk application, each assembly A, A1, A2 and A3 operates on one side of six segments. Two of the assemblies operate on one side of a segment and the other two operate on the other side, so that after a fruit has been subjected to all four assemblies both sides of twelve segments will have been separated from their associated membranes. The device (not shown) that finally removes the core and membranes, termed the "rag" in the art, can thereby readily remove such rag from any segments which have not been completely severed from their membranes, as would be the case in the case of a grapefruit having more than 12 segments.

A situation wherein the lateral spacing of the membranes M1 and M2 is relatively small is indicated in FIG. 12. In this figure the finder knife has wedgingly engaged the membrane M1 and has been wedged to the left in the figure until its cutting edge engages the membrane M2. Since springs 132 are not strong enough to cut the membranes, as the finder knife assembly continues to descend under the force of weight 108, the spring 132 associated with the finder knife shown in FIG. 12 is compressed and the finder knife remains in the position of FIG. 12 during the remainder of the down stroke of the carrier assembly. However the nose of the cutting blade is properly positioned to enter the meat sac and separate it from the membrane M2. Thus each finder knife automatically accommodates for variations in membrane spacing.

It will be apparent that the present invention provides unique guide or pilot members that accurately position the sectionizing blades, before the blades are moved downwardly into the fruit.

Having been fully described that which is desired to be protected by Letters Patent is:

1. In a citrus fruit sectionizing machine, means for supporting a fruit with its stem-blossom axis oriented in a predetermined direction, a blade carrier aligned with said fruit supporting means, means for reciprocating said blade carrier in a direction parallel to the axis of the fruit, a segment cutting blade mounted on said blade carrier, a finder blade support shank mounted centrally of said blade carrier for reciprocation relative to said carrier and along the fruit axis, a finder blade associated with said cutting blade, means for mounting said finder blade for lateral motion on said shank, cutting blade stop means on said finder blade, spring means urging said cutting blade laterally against said finder blade stop means, said spring means also moving the finder blade laterally to one extreme position, a tapered wedge surface on the edge of said finder blade remote from the cutting blade, said cutting blade having a tapered nose, initial downward motion of said blade carrier causing the finder blade to penetrate the fruit with its tapered surface riding over a membrane so that said finder and cutting blades move against the force of said spring means to move said cutting blade toward the opposite membrane, further motion of said blade carrier causing the cutting blade to pass along the membrane to sever the segment therefrom, said finder blade remaining stationary during said further motion of the blade carrier.

2. In a citrus fruit sectioning machine, means for supporting a fruit with its stem-blossom axis oriented in a predetermined direction, a blade carrier aligned with said fruit supporting means, means for reciprocating said blade carrier in a direction parallel to the axis of the fruit, a plurality of segment cutting blades mounted on said blade carrier, a finder blade support shank mounted centrally of said blade carrier for reciprocation relative to said carrier and along the fruit axis, a finder blade associated with each cutting blade, means for mounting each finder blade for lateral motion on said shank, cutting blade stop means on each finder blade, spring means urging said cutting blades laterally against the associated finder blade stop means, said spring means also moving the finder blades laterally to one extreme position, a tapered wedge surface on the edges of said finder blades remote from the cutting blades, said cutting blades having a tapered nose, initial downward motion of said blade carrier causing the finder blades to penetrate the fruit with their tapered surfaces riding over a membrane so that said finder and cutting blades move against the force of said spring means to move said cutting blades toward the opposite membrane, further motion of said blade carrier causing the cutting blades to pass along the membrane to sever the segment therefrom, said finder blades remaining stationary during said further motion of the blade carrier.

3. In a citrus fruit sectionizing machine, means for supporting a fruit with its stem-blossom axis oriented in a predetermined direction, a blade carrier aligned with said fruit supporting means, means for reciprocating said blade carrier in a direction parallel to the axis of the fruit, a plurality of segment cutting blades mounted on said blade carrier, a finder blade support shank mounted centrally of said blade carrier for reciprocation relative to said carrier and along the fruit axis, a finder blade associated with each cutting blade, each finder blade having an elongated stem pivotally mounted on said shank, cutting blade stop means on each finder blade, spring means urging said cutting blades laterally against the associated finder blade stop means, said spring means also moving the finder blades laterally to one extreme position, a tapered wedge surface on the edges of said finder blades remote from the cutting blades, said cutting blades having a tapered nose, initial downward motion of said blade carrier causing the finder blades to penetrate the fruit with their tapered surfaces riding over a membrane so that said finder and cutting blades move against the force of said spring means to move said cutting blades toward the opposite membrane, further motion of said blade carrier causing the cutting blades to pass along the membrane to sever the segment therefrom, said finder blades remaining stationary during said further motion of the blade carrier.

4. In a citrus fruit sectionizing machine, means for supporting a fruit with its stem-blossom axis oriented in a predetermined direction, a blade carrier aligned with said fruit supporting means, means for reciprocating said blade carrier in a direction parallel to the axis of the fruit, a plurality of segment cutting blades mounted on said blade carrier, a finder blade support shank mounted centrally of said blade carrier for reciprocation relative to said carrier and along the fruit axis, a finder blade associated with each cutting blade, means for mounting each finder blade for lateral motion on said shank, said mounting means including a spring for resiliently urging each finder blade longitudinally of said shank and toward the fruit, cutting blade stop means on each finder blade, spring means urging said cutting blades laterally against the associated finder blade stop means, said spring means also pivoting the finder blades to one extreme position, a tapered wedge surface on the edges of said finder blades remote from the cutting blades, said cutting blades having a tapered nose, initial downward motion of said blade causing the finding blades to penetrate the fruit with their surfaces riding over a membrane so that said finder and cutting blades move against the force of said spring means to move said cutting blades toward the opposite membrane, further motion of said blade carrier causing the cutting blades to pass along the membrane to sever the segment therefrom, said finder blades remaining stationary during said further motion of the blade carrier.

5. In a citrus fruit sectionizing machine, means for supporting a fruit with its stem-blossom axis oriented in a predetermined direction, a blade carrier aligned with said fruit supporting means, means for reciprocating said blade carrier in a direction parallel to the axis of the fruit, a plurality of segment cutting blades mounted on said blade carrier for pivotal motion about axes parallel to the fruit axis, a finder blade support shank mounted centrally of said blade carrier for reciprocation relative to said carrier and along the fruit axis, a finder blade associated with each cutting blade, means for mounting each finder blade for lateral motion on said shank, cutting blade stop means on each finder blade, first spring means urging said cutting blades laterally against the associated finder blade stop means, said spring means also pivoting the finder blades to one extreme position, the faces of each cutting blade that engages said stop means forming an acute angle with a radial plane passing through the blade axes, a tapered wedge surface on the edges of said finder blades remote from the cutting blades, said cutting blades having a tapered nose with the taper extending from the tip of the blade in a direction opposite from the tapered wedge surface of the finder blades, and second spring means for pivoting said cutting blades about their axes in a direction tending to increase said acute angle, initial downward motion of said blade carrier causing the finder blades to penetrate the fruit with their tapered surfaces riding over a membrane so that said finder and cutting blades move against the force of said first spring means to move said cutting blades toward membrane, a radial portion and along the associated membrane, further motion of said blade carrier causing the tapered edges of said cutting blades to ride over the edge of the adjacent fruit membrane to turn the cutting blades against the force of said second springs while the cutting blades pass along the membrane to sever the segment therefrom, said finder blades remaining stationary during said further motion of the blade carrier.

6. In a citrus fruit sectionizing machine, means for supporting a fruit with its stem-blossom axis oriented in a predetermined direction, a blade carrier aligned with said fruit supporting means, means for reciprocating said blade carrier in a direction parallel to the axis of the fruit, a plurality of segment cutting blades mounted on said blade carrier for pivotal motion about axes parallel to the fruit axis, a finder blade support shank mounted centrally of said blade carrier for reciprocation relative to said carrier and along the fruit axis, a finder blade associated with each cutting blade, means for mounting each finder blade for lateral motion of said shank, said mounting means including a spring for resiliently urging each finder blade longitudinally of said shank and toward the fruit, cutting blade stop means on each finder blade, first spring means urging said cutting blades laterally against the associated finder blade stop means, said spring means also pivoting the finder blades to one extreme position, the faces of each cutting blade that engage said stop means forming an acute angle with a radial plane passing through the blade axes, a tapered wedge surface on the edges of said finder blades remote from the cutting blades, said cutting blades having a tapered nose with the taper extending from the tip of the blade in a direction opposite from the tapered wedge surface of the finder blades, and second spring means for pivoting said cutting blades about their axes in a direction tending to increase said acute angle, initial downward motion of said blade carrier causing the finder blades to penetrate the fruit with their tapered surfaces riding over a membrane so that said finder and cutting blades move against the force of said first spring means to move said cutting blades toward a radial position and along the associated membrane, further motion of said blade carrier causing the tapered edges of said cutting blades to ride over the edge of the adjacent fruit membrane to turn the cutting blades against the force of said second springs while the cutting blades pass along the membrane to sever the segment therefrom, said finder blades remaining stationary during said further motion of the blade carrier.

7. In a citrus fruit sectionizing machine, means for supporting a fruit with its stem-blossom axis oriented in a predetermined direction, a blade carrier aligned with said fruit supporting means, means for reciprocating said blade carrier in a direction parallel to the axis of the fruit, a plurality of segment cutting blades mounted on said blade carrier for pivotal motion about axes parallel to the fruit axis, a finder blade support shank mounted centrally of said blade carrier for reciprocation relative to said carrier and along the fruit axis, a finder blade associated with each cutting blade, means for mounting each finder blade for lateral motion on said shank, cutting blade stop means on each finder blade, first spring means urging said cutting blades laterally against the associated finder blade stop means, said spring means also pivoting the finder blades to one extreme position, the faces of each cutting blade that engages said stop means forming an acute angle with a radial plane passing through the blade axes, a tapered wedge surface on the edges of said finder blades remote from the cutting blades, the outer edges of said finder blades being sharpened, said cutting blades having a tapered nose with the taper extending from the tip of the blade in a direction opposite from the tapered wedge surface of the finder blades, and second spring means for pivoting said cutting blades about their axes in a direction tending to increase said acute angle, initial downward motion of said blade carrier causing the finder blades to penetrate the fruit with their tapered surfaces riding over a membrane so that said finder and cutting blades move against the force of said first spring means to move said cutting blades toward a radial position and along the associated membrane, further motion of said blade carrier causing the tapered edges of said cutting blades to ride over the edge of the adjacent fruit membrane to turn the cutting blades against the force of said second springs while the cutting blades pass along the membrane to sever the segment therefrom, said finder blades remaining stationary during said further motion of the blade carrier.

8. In a citrus fruit sectionizing machine, means for supporting a fruit with its stem-blossom axis oriented in a predetermined direction, a blade carrier aligned with said fruit supporting means, means for reciprocating said blade carrier in a direction parallel to the axis of the fruit, a plurality of segment cutting blades mounted on said blade carrier for pivotal motion about axes parallel to the fruit axis, a finder blade support shank mounted centrally of said blade carrier for reciprocating relative to said carrier and along the fruit axis, a finder blade associated with each cutting blade, each finder blade having an elongated stem, pivots mounting said finder blade stems on said shank, relief springs engaging the stem pivots for urging the blades along said shank and toward the fruit, cutting blade stop means on each finder blade, first spring means urging said cutting blades laterally against the associated finder blade stop means, said spring means also pivoting the finder blades laterally to one extreme position, the faces of each cutting blade that engage said stop means forming an acute angle with a radial plane passing through the blade axis, a tapered wedge surface on the edges of said finder blades remote from the cutting blades, said cutting blades having a tapered nose with the taper extending from the tip of the blade in a direction opposite from the tapered wedge surface of the finder blade, and second spring means for pivoting said cutting blades about their axes and in a direction tending to increase said acute between each cutting blade and a radial plane, initial downward motion of said blade carrier causing the finder blades to penetrate the fruit with their tapered surfaces riding over a membrane so that said finder and cutting blades move against the force of said first spring means to move said cutting blades toward a radial position and along the associated membrane, further downward motion of said blade carrier causing the tapered edges of said cutting blades to ride over the edge of the adjacent fruit membrane to turn the cutting blades against the force of said second spring means while the cutting blades pass along the membrane to sever the segment therefrom, said finder blades remaining stationary during said further downward motion of the blade carrier.

9. In a citrus fruit sectionizing machine, means for supporting a fruit with its stem-blossom axis vertically oriented, a blade carrier aligned with said fruit supporting means, means for reciprocating said blade carrier in a vertical direction, a plurality of segment cutting blades mounted on said blade carrier for pivotal motion about vertical axes, a vertical finder blade support shank mounted centrally of said blade carrier for reciprocating relative to said carrier, a finder blade associated with each cutting blade, each finder blade having an elongated stem, pivots mounting said finder blade stems on said shank for lateral motion of said finder blades, relief springs engaging the stem pivots for urging the blades downwardly along said shank toward the fruit, a weight on said shank of sufficient mass to overcome said relief springs, and cutting blade stop means on each finder blade, first spring means urging said cutting blades laterally against the associated finder blade stop means, said spring means also pivoting the finder blades laterally to one extreme position, the faces of each cutting blade that engage said stop means forming an acute angle with a radial plane passing through the blade axis, a tapered wedge surface on the edges of said finder blades remote from the cutting blades, said cutting blades having a tapered nose with the taper extending from the tip of the blade in a direction opposite from the tapered wedge surface of the finder blade, and second spring means for pivoting said cutting blades about their axes and in a direction tending to increase said acute between each cutting blade and a radial plane, initial downward motion of said blade carrier causing the finder blades to penetrate the fruit with their tapered surfaces riding over a membrane so that said finder and cutting blades move against the force of said first spring means to move said cutting blades toward a radial position and along the associated membrane, further downward motion of said blade carrier causing the tapered edges of said cutting blades to ride over the edge of the adjacent fruit membrane to turn the cutting blades against the force of said second spring means while the cutting blades pass along the membrane to sever the segment therefrom, said finder blades remaining stationary during said further downward motion of the blade carrier.

10. In a citrus fruit sectionizing machine, means for holding a citrus fruit in fixed position with its stem-blossom axis disposed in a generally vertical orientation, a blade carrier mounted above said fruit holder for vertical movement toward and away from said fruit holder, a finder blade mounted on said carrier for vertical movement therewith and lateral movement relative thereto, means defining a slanted edge on the lower portion of said finder blade, a sectionizing blade mounted on said carrier for vertical movement therewith and for lateral movement relative thereto, the lower end of said finder blade extending downwardly to a point spaced below the lower end of said sectionizing blade, means for moving said carrier downwardly to move the lower slanted edge of said finder blade into engagement with a membrane of the fruit, the contact of said slanted edge with said membrane being effective during further downward movement of said finder blade to move said finder blade laterally, and abutment means on said finder blade for engaging said sectionizing blade during said lateral movement and move said sectionizing blade to a position adjacent a membrane of the fruit.

11. In a citrus fruit sectionizing machine, a support, a laterally movable membrane finder blade and a sectionizing blade connected to said support, guide means on said finder blade for constraining said sectionizing blade to describe a predetermined path, and yieldable means for urging said sectionizing blade in engagement with said guide means to condition said sectionizing blade to describe such predetermined path, whereby engagement of said finder blade with the radial membrane of a citrus fruit causes lateral movement thereof and said sectionizing blade to a point along such predetermined path.

12. In a citrus fruit sectionizing machine, a first support, membrane finder blades, means connecting said finder blades to said first support for limited pivotal and for limited slidable movement relative to said first support, a laterally extending guide means secured to said finder blades, a second support, sectionizing blades, means connecting said sectionizing blades to said second support for limited rotational and orbiting movement, said sectionizing blade having respective portions thereof abuttingly engaged with the formed portion of said guide means, wherein engagement of said finder blades with the radial membrane of a citrus fruit causes pivotal movement thereof and said sectionizing blades to position said sectionizing blades closely adjacent certain of the radial membranes.

13. In a citrus fruit sectionizing machine, means for holding a citrus fruit in fixed position with its stem-blossom axis disposed in a generally vertical orientation, a blade carrier mounted above said fruit holder for vertical movement toward and away from said fruit holder, a membrane-finding member carried by said fruit holder for downward movement therewith and arranged to move laterally to engage a membrane of the fruit, a sectionizing blade mounted on said carrier for vertical movement therewith, means for moving said carrier downwardly to cause said membrane-finding member to penetrate the fruit between adjacent membranes and move laterally to engage one of the membranes, and means interconnecting said member and said blade for unitary lateral movement to position said blade adjacent the membrane engaged by the finder member, said finder member having a slidable connection with said carrier whereby, during continued downward movement of said carrier after said finder has engaged the membrane, the blade will move downwardly into the fruit while the finder remains at the upper end of the fruit.

References Cited in the file of this patent

UNITED STATES PATENTS

| | | |
|---|---|---|
| 2,129,101 | Polk | Sept. 6, 1938 |
| 2,199,345 | Polk | Apr. 30, 1940 |
| 3,045,729 | Belk et al. | July 24, 1962 |